J. KENNEDY.
GEAR.
APPLICATION FILED OCT. 14, 1914.
1,144,137.
Patented June 22, 1915.
2 SHEETS—SHEET 1.
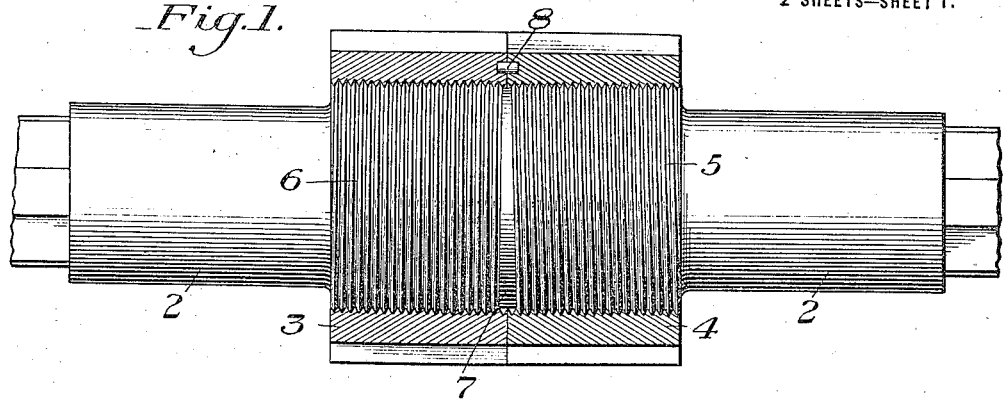
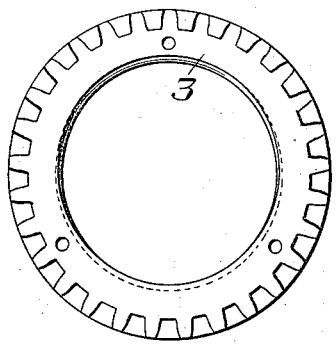
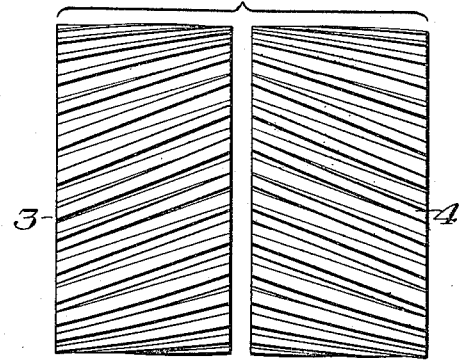
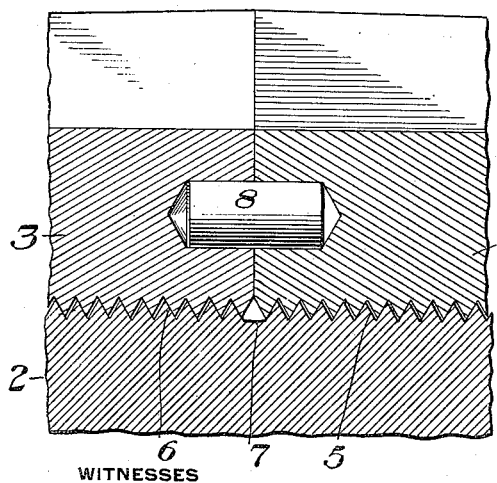
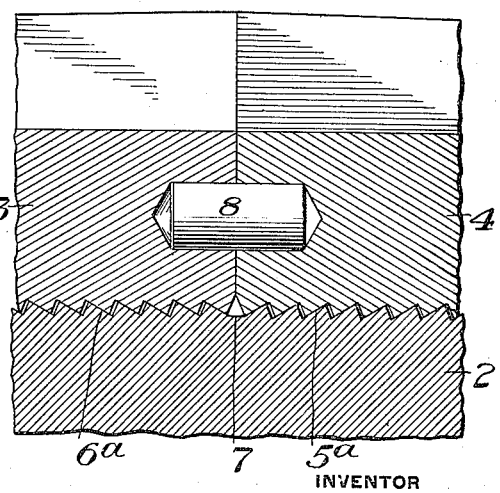
WITNESSES
INVENTOR
Julian Kennedy,
by Bakewell, Byrnes & Parmelee
Attys

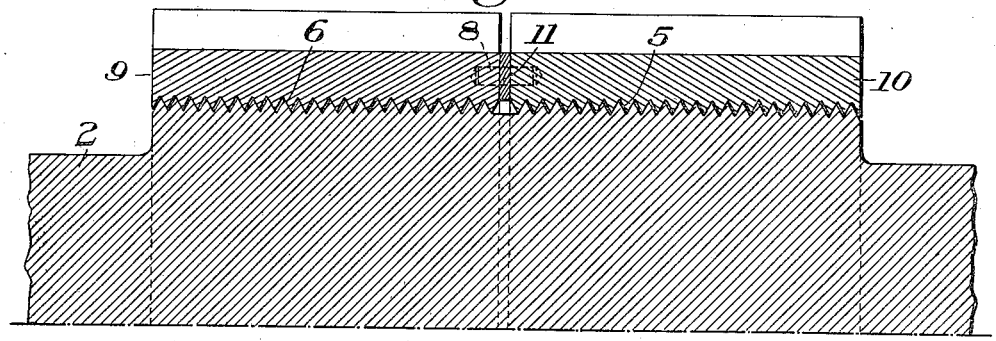
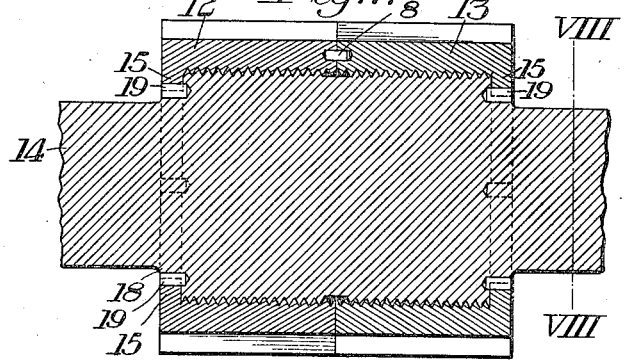
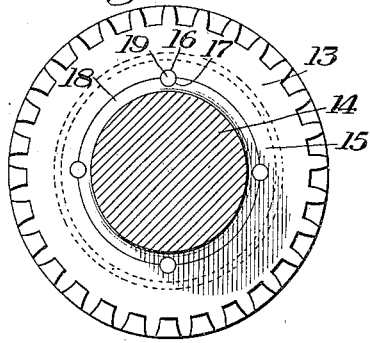
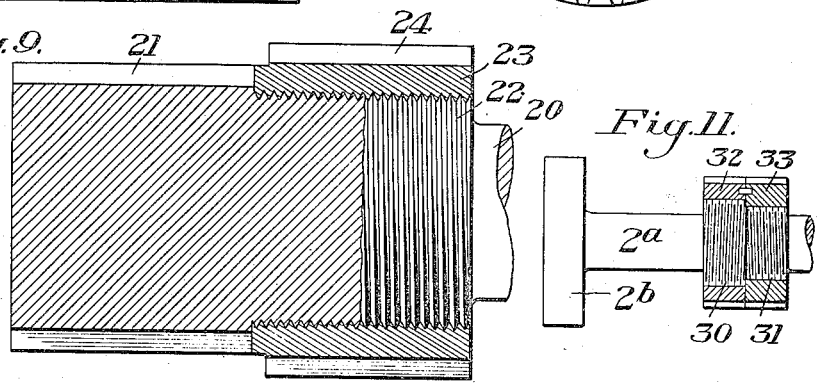
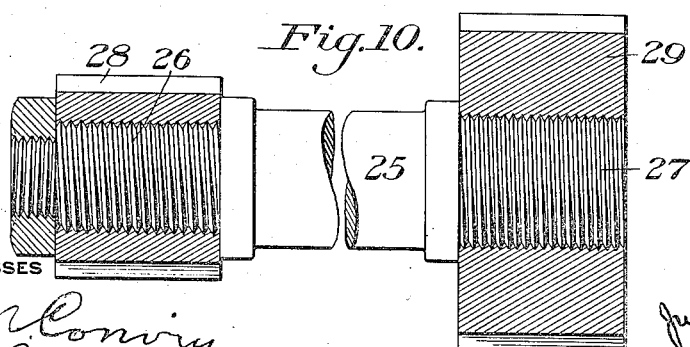

UNITED STATES PATENT OFFICE.

JULIAN KENNEDY, OF PITTSBURGH, PENNSYLVANIA.

GEAR.

1,144,137.  Specification of Letters Patent.  Patented June 22, 1915.

Application filed October 14, 1914. Serial No. 866,621.

*To all whom it may concern:*

Be it known that I, JULIAN KENNEDY, a citizen of the United States, residing at Pittsburgh, in the county of Allegheny and State of Pennsylvania, have invented a new and useful Improvement in Gears, of which the following is a full, clear, and exact description, reference being had to the accompanying drawings, forming part of this specification, in which—

Figure 1 is a view partly in side elevation and partly in section of a double helical gear, illustrating my invention, Fig. 2 is an end view of one of the gear rings, looking at the inner end thereof, Fig. 3 is a side view of the gear rings removed. Figs. 4 and 5 are fragmentary sectional views showing two different forms of screw threads which may be employed. Figs. 6 and 7 are longitudinal sectional views showing a modification. Fig. 8 is a section on the line VII—VII of Fig. 7. Figs. 9 and 10 are longitudinal sectional views showing other embodiments of my invention. Fig. 11 is a view partly in section and partly in side elevation, showing still another embodiment of the invention.

My invention has relation to improvements in gears; and is particularly applicable to large gears such, for instance, as are employed in rolling mill drives, although useful for various other purposes.

The invention is also especially applicable to double helical, or herring-bone gears.

In the manufacture of large gears, if the rim portion of the gear carrying the gear teeth is formed integral with the body of the gear or with the shaft member which carries it, it is difficult to properly temper metal owing to the relatively large mass. If, on the other hand, the rim portions of the gears are made separately and are fastened to the shaft or carrier after being tempered according to the usual methods, there is danger that they may become warped or twisted; and when keys are used to secure them to the body or carrier, the cutting of the key-ways not only weakens the gears, but the driving of the keys may start cracks or initial fracture points. My invention is designed to provide means whereby these difficulties may be overcome and the rim portions of the gears may be separately formed and readily secured to the shaft or carrier in a secure manner, without distorting or weakening them in any way.

Referring first to that form of my invention which is shown in Figs. 1 to 4, inclusive, the numeral 2 designates a shaft member carrying a double helical or herring-bone gear. This gear is formed in two separate rings or rim portions 3 and 4; and to secure them in place the shaft member 2 is formed with right and left hand threaded portions 5 and 6. These two threaded portions are separated from each other at their adjacent ends by a clearance space 7.

In making the gear, the ring or rim members 3 and 4 may have their gear teeth separately cut therein. They are then screwed upon the right and left hand threaded portions from opposite ends, until the gear teeth properly aline. They can then be marked and screwed away from each other sufficiently to permit of the drilling of registering seats for a number of dowel pins 8. The dowels are then inserted and the members are again screwed up together, the dowels locking the two members together with the gears in correctly registering relation. During this operation, as soon as the dowels are inserted in both gear members, the latter are turned in unison until they come into the final positions shown. In service, it will be readily seen that the tendency is to constantly tighten the ring or rim members on their threaded connections with the shaft, since the two members are connected as a unit by the dowels so far as any relative turning movement is concerned. The screw threads 5 and 6 may be of the standard V-form shown in Figs. 1 and 4; or they may be of the modified form shown at 5ª and 6ª in Fig. 5, in which each tooth has one relatively long sloping face and its other face is relatively shorter and more abrupt. In either form, the intermeshing threads of the shaft and gear members may be given considerable clearance, as indicated. When assembled in the manner above described, the threads will adjust themselves in such a manner as to give a continuous thrust bearing on one face of each thread. This enables the threads on the shaft members to be more or less roughly cut. In certain cases the dowel pins may be omitted.

Fig. 6 shows a modification which is somewhat better adapted for use where it may be desired to remove or renew the ring or rim members. In this form, the construction is the same as that first described, except that in addition to the dowels 8, the two gear members 9 and 10 are screwed up against an interposed ring or separator 11. When it is desired to remove either gear member, this ring or separator can be cut out to permit the gear members to be unscrewed from the shaft.

In the construction shown in Figs. 7 and 8, the two gear members 12 and 13 are screwed on to the shaft 14 in the same manner as in the constructions above described, but each of them is formed at its outer end with an inturned flange 15. Each of these flanges is formed with a plurality of half circular recesses 16, which register with corresponding half recesses 17 in the shoulders 18 of the shaft. These registering recesses form seats for pins 19 which act to secure the gear members to the shaft.

Fig. 9 shows an embodiment of my invention in which the shaft or carrier 20 is itself provided with one set of gear teeth 21 and also has a threaded portion 22 upon which is secured a gear rim or ring 23 having gear teeth 24. The direction of the threads forming the connection for the member 23 is such that the load or strain on said members tends to tighten the connection.

Fig. 10 shows a form of my invention in which the shaft member 25 has two threaded portions 26 and 27 having screwed thereon, respectively, the gears 28 and 29. The threads forming the connection for the two gears are of the same hand; and it will be readily seen that assuming the gear 29 to be driven in a clockwise direction to drive the shaft 25, it will tend to tighten on its threaded connection with the shaft; while at the same time the rotation of the shaft will tend to tighten its connection with the gear 28.

Fig. 11 shows a form of my invention generally similar to that shown in Fig. 1, but illustrating a case in which the shaft member 2ª is formed at one end with a projection 2ᵇ of such form or character that it will not permit one of the gear rings or rims to be screwed on over that end of the shaft. In such cases, I provide the shaft with a screw threaded portion 30 with the threads running in one direction and of relatively large diameter, and an adjacent screw threaded portion of smaller diameter with a reverse thread. The two gear members 32 and 33 can be screwed in place from the same end. While I have shown the threads of the portions 30 and 31 cut directly on the body of the shaft, this is not essential as they may be formed on any suitable carrier.

The advantages of my invention will be readily understood, since it entirely obviates the employment of keys or other fastenings having a tendency to strain or fracture the gears, or to work loose in service; and provides a secure fastening in which the tendency in service is to constantly tighten the connection between the gear members and the shaft or carrier. The invention also overcomes the difficulties of improper alinement of the gear teeth. My invention also provides a gear in which the rim portion can be formed of one grade of metal of proper degree of hardness and wear resisting qualities, while the body portion may be entirely different and a softer and less expensive grade of metal.

What I claim is:

1. A double helical or herring-bone gear, comprising a body portion or carrier having adjacent oppositely threaded portions and two separate rim or ring members screwed on said threaded portions, and having teeth which together form the complete gear; substantially as described.

2. A double helical or herring-bone gear, comprising a body portion or carrier having adjacent oppositely threaded portions and two separate rim or ring members screwed on said threaded portions, and having teeth which together form the complete gear, together with means for securing the two rim or ring members against independent turning movement on the body or carrier; substantially as described.

3. A double helical or herring-bone gear, comprising a shaft member or carrier having adjacent right and left threaded portions separated from each other by a clearance space and two separate gear members screwed on said threaded portions, and having means for locking them together to prevent independent turning thereof on the shaft or carrier; substantially as described.

4. A gear of the character described, comprising a shaft or carrier member having adjacent right and left threaded portions and two separate toothed ring or rim members screwed on said threaded portions, and having interposed connecting means; substantially as described.

In testimony whereof, I have hereunto set my hand.

JULIAN KENNEDY.

Witnesses:
H. W. RAUO,
J. W. KENNEDY.